Sept. 21, 1965 R. NAVILLE 3,207,038
GEAR HOBBING MACHINE
Filed April 29, 1963 5 Sheets-Sheet 1

INVENTOR
RAYMOND NAVILLE
By Irwin S. Thompson
ATTY.

Sept. 21, 1965  R. NAVILLE  3,207,038
GEAR HOBBING MACHINE
Filed April 29, 1963  5 Sheets-Sheet 4

INVENTOR
RAYMOND NAVILLE
By Irwin S. Thompson
ATTY.

Sept. 21, 1965   R. NAVILLE   3,207,038
GEAR HOBBING MACHINE
Filed April 29, 1963   5 Sheets-Sheet 5

INVENTOR
RAYMOND NAVILLE
By Irwin S. Thompson
ATTY.

though it is not necessary to insert at this place a description of well-known elements of gear

United States Patent Office
3,207,038
Patented Sept. 21, 1965

3,207,038
GEAR HOBBING MACHINE
Raymond Naville, Nidau, Bern, Switzerland, assignor to Fabrique de Machines Mikron S.A., Bienne, Switzerland, a corporation of Switzerland
Filed Apr. 29, 1963, Ser. No. 276,337
Claims priority, application Switzerland, May 11, 1962, 5,691/62
4 Claims. (Cl. 90—4)

Figure 6:
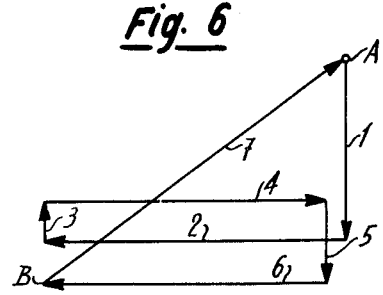

The now existing gear hobbing machines are intended to effect a working cycle comprising displacements of a rotative cutting tool corresponding to the diagram shown in FIG. 6. These displacements of the tool with respect to the workpiece are the following, the said tool as well as the said workpiece being driven in rotation at determined speeds:

(1) The forwarding of the tool from its returned position A to an advanced position corresponding to the rough or prefinished size of the workpiece.

(2) The forward traverse, or lateral displacement parallel to the workpiece, of the tool along a distance greater than the length of the workpiece. During this operation the workpiece is machined at its rough or prefinished size.

(3) The withdrawal of the tool out of engagement with the workpiece.

(4) The return traverse, or lateral displacement parallel to the workpiece, of the tool but in a direction opposed to the one of the traverse effected under No. 2 in order to place the tool back in its position at the beginning of the machining.

(5) The forwarding of the tool in the direction of the workpiece until a position corresponding to the finishing size of the workpiece.

(6) The traverse of the tool along the workpiece, operation similar to operation No. 2, in order to machine the workpiece at its definitive size.

(7) The withdrawal of the tool until its returned position A from its end machining position B by means of a return traverse (operation No. 4) and a simultaneous withdrawal of the tool.

It is evident that the operations Nos. 2–5 may be repeated several times, as many times as it is necessary to provide machining passes to cut the desired toothing on the workpiece. The operation No. 7 is done only when the machining of the workpiece is terminated.

Such a cycle of displacement of the tool comprises several unproductive displacements which limit the productivity of these hobbing machines. The aim of the present invention is to reduce these unproductive times and thus, to increase the productivity and the efficiency of these gear hobbing machines.

The present invention has for its object a gear hobbing method for cutting spur and helical gears comprising the steps of machining a workpiece by means of a milling cutter during the forward stroke as well as during the return stroke of the traverse displacement of said cutting tool; of reversing the direction of displacement of the cutting tool and of moving said cutting tool towards the workpiece of a determinate amount at the end of the traverse stroke of said tool and of maintaining the revolving direction of the tool as well as the one of the workpiece unchanged.

The present invention has also for its object a gear hobbing machine for cutting spur and helical gears comprising a driving-in-rotation device of a rotative cutting tool, a driving-in-rotation device of a workpiece having a differential, as well as traversing and forwarding devices of the cutting tool, which comprises a reversing device provoking at the end of the traverse stroke the reversing of the direction of the rectilinear traverse of said tool and comprising further a forwarding device provoking, also at the end of the traverse stroke of the tool, the displacement of said tool towards the workpiece of a determinate amount.

The attached drawing shows schematically and by way of example one embodiment of the gear hobbing machine according to the invention.

Figure 1:
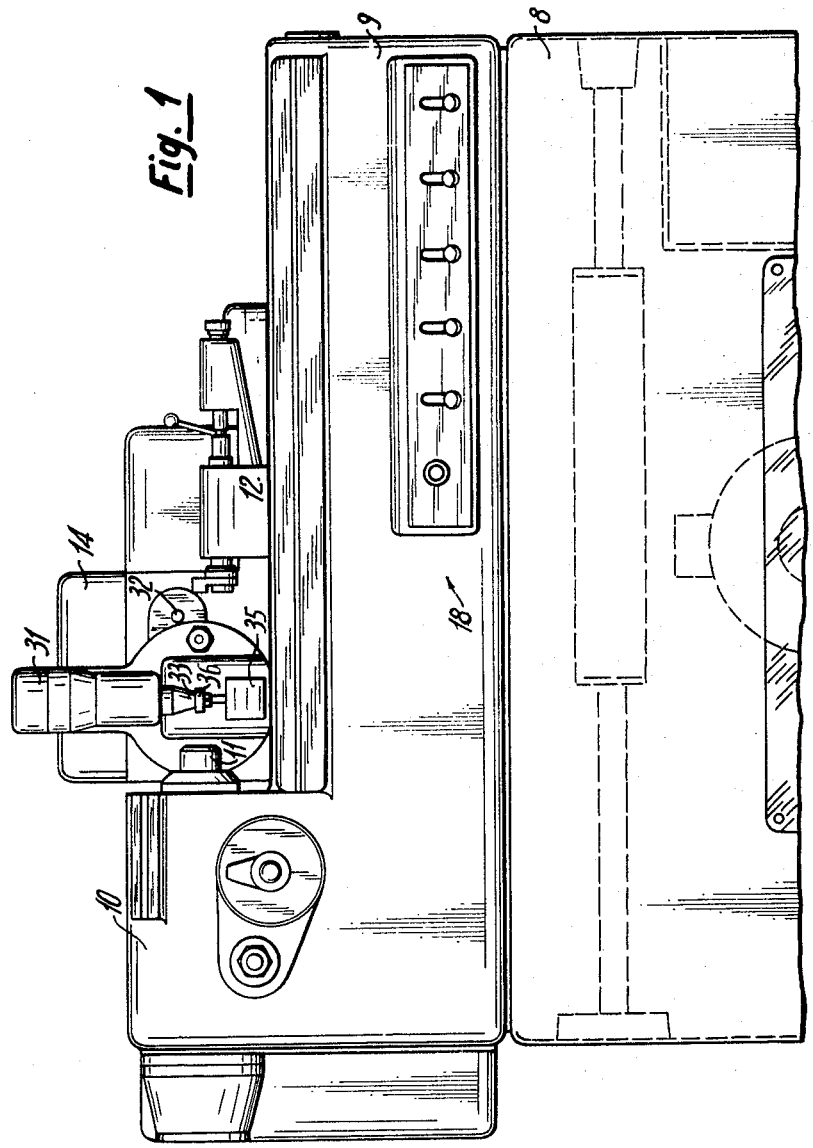
Figure 2:
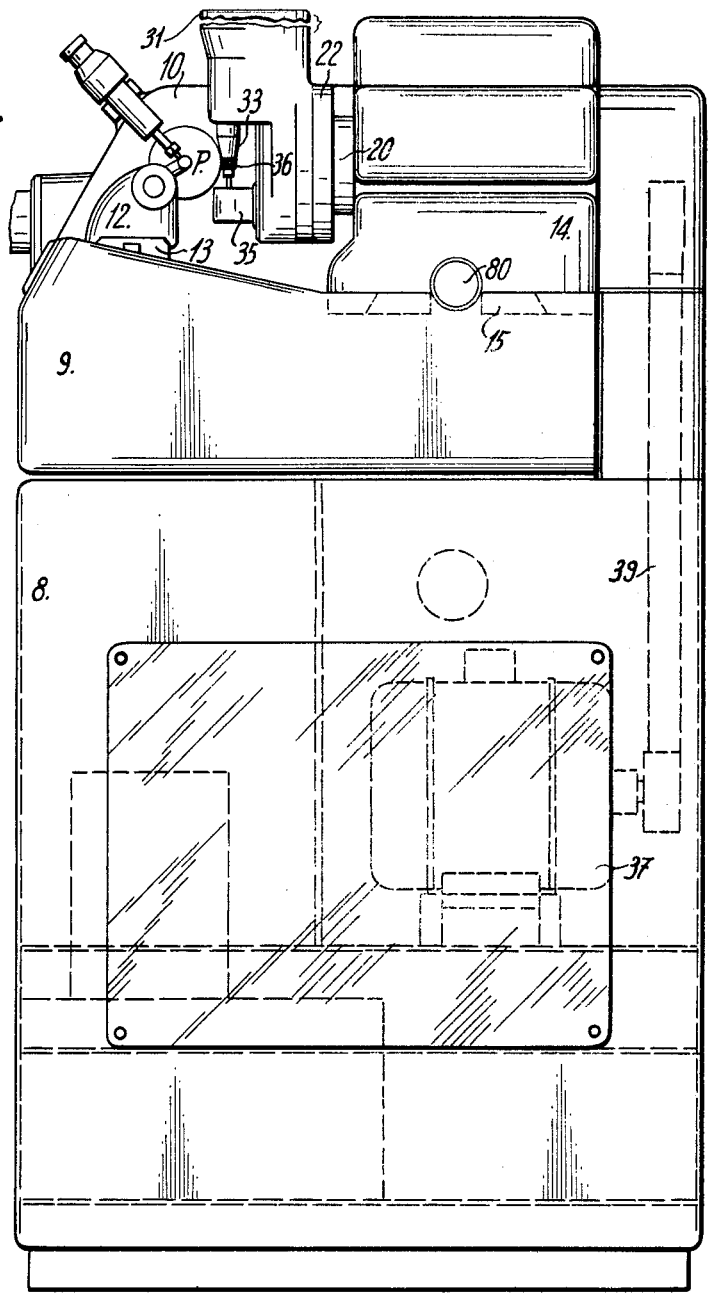
Figure 3:
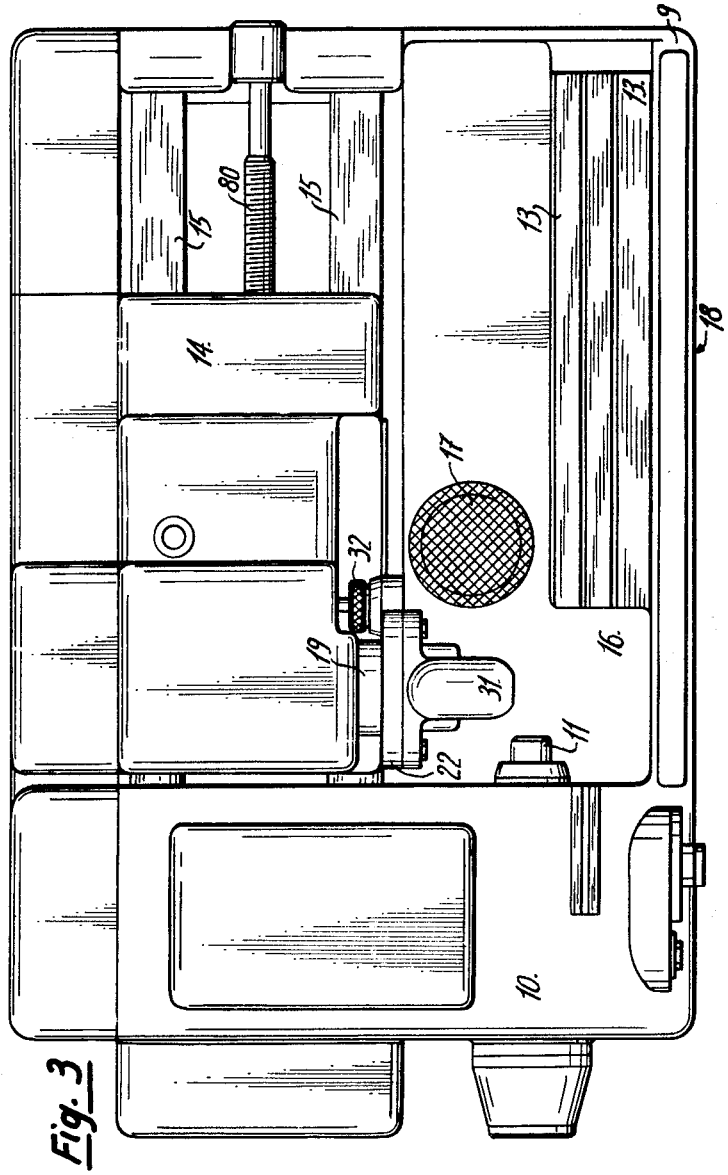
Figure 4:
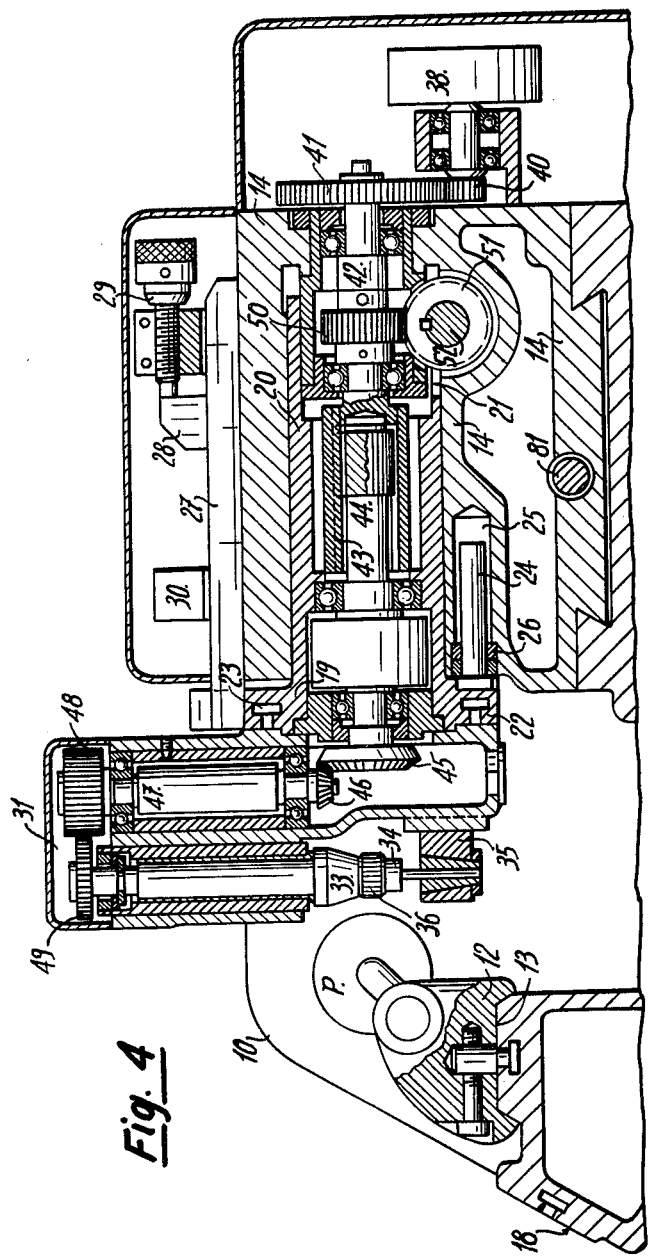
Figure 5:
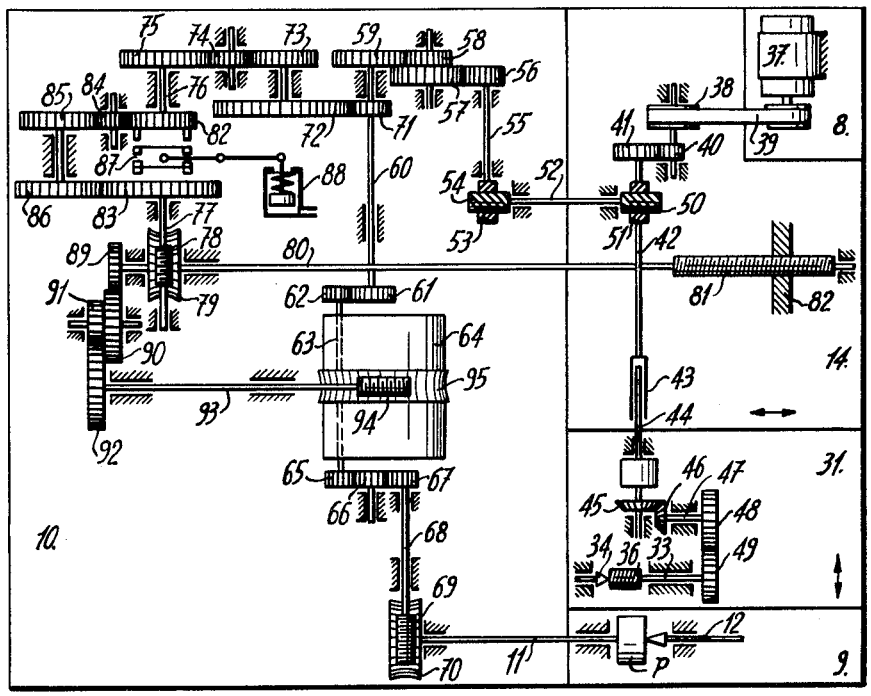
Figure 7:
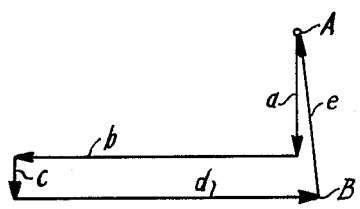

FIG. 1 is a partial front elevation view.
FIG. 2 is a side elevation view.
FIG. 3 is a top view.
FIG. 4 is a partial view, certain parts being seen in cross-section and others withdrawn.
FIG. 5 is a simplified diagram showing the mechanical driving connections for the different mobile members of the gear hobbing machine.
FIG. 6 is a diagram showing the cycle of displacements of a rotative cutting tool of a now-existing gear hobbing machine.
FIG. 7 is a diagram showing the cycle of displacements of a rotative cutting tool of the gear hobbing machine according to the invention.

The method according to the present invention enables the reduction of the movements and thus of the unproductive times of the cycle of displacements of a rotative cutting tool of the now-existing gear hobbing machines in order to increase the productivity and the efficiency of these spur and helical gear hobbing machines.

This gear hobbing method enables the realization of a cycle of displacements of a rotative cutting tool of a gear hobbing machine such as shown in FIG. 7 and which comprises, the workpiece or rough piece as well as the tool being driven in rotation, the following operations:

(a) The forwarding of the tool towards the workpiece from its returned or rest position A to a forwarded position corresponding to the rough or prefinished size of the workpiece.

(b) The forward traverse, or lateral displacement parallel to the workpiece, of the tool on a distance greater than the length of the workpiece. During this tool displacement the workpiece is machined down to its rough or prefinished size.

(c) The forwarding of the tool towards the workpiece until a position corresponding to the finished size of said workpiece.

(d) The return traverse, or lateral displacement parallel to the workpiece, of the tool along a distance greater than the length of said workpiece but in a direction opposed to the traverse displacement described in (b). During this return traverse stroke of the tool the workpiece is machined down to its final desired size.

(e) The withdrawal of the tool from its end-machining position B until its initial or rest position A.

The cycle of displacement of the cutting tool shown and described above, comprises only two machining passes, however, it is evident that several successive passes could be done. In fact, a forwarding operation could follow the operation (d) in order to bring the tool into a position corresponding to the size of a third machining pass. After this forwarding operation, operations similar to the operations (b), (c), and (d) would follow. The operation (e) would be done only when the desired number of successive passes had been reached.

According to this method a first machining pass is effected for example in conventional cutting, then the second pass is effected in climb cutting, the third pass is again effected in conventional cutting, and so on. It is evident that the machining passes having an even number order or the passes bearing an odd number order can be effected in conventional cutting, the others, that is the passes bearing an odd or even number order respectively would be effected in climb cutting.

Generally this is determined by the type of cutting, conventional or climb, which is desired for the last finishing pass. In fact, depending on the materials to be machined, the speeds and the cutting angles used, one obtains a greater precision and a better finish by either the conventional or the climb cutting.

When cutting spur gears by means of this method the tool is displaced towards the workpiece of a determined amount and the direction of the straight traverse movement is reversed at the end of the traverse stroke of the tool.

On the contrary, when cutting helical gears by means of this method, the speed of rotation $v$ of the workpiece is modified with the change of traverse direction of the tool. This modification $dv$ of the speed of rotation of the workpiece is such that it introduces, with respect to the speed $vo$ to which this workpiece should revolve if a spur toothing of same modulus were cut, a lead or a lack, that is to say an increase or a reduction of said speed $vo$ according to the direction of the traverse displacement of the tool parallel to the axis of the workpiece, so that a same helical toothing can be machined either in conventional or in climb cutting.

The value $dv$ of said speed modification depends on the angle which the helical toothing makes with respect to the axis of the workpiece.

The invention has also for its object a gear hobbing machine to carry into effect the described gear hobbing method.

The machine comprises a base or lower frame 8 constituted for example by a bed made in shape irons on which protective panels are fixed, and an upper frame 9 on which the different mobile members of the gear hobbing machine are mounted. This upper frame 9 has rigidly fixed on it a headstock 10, which in the example shown is made of one piece with the upper frame 9 and constitutes one of its ends. A workpiece carrying spindle 11 is journaled in said headstock 10 and shows a horizontally disposed rotation axis, parallel to the longitudinal symmetry axis of the upper frame 9. In alignment with the rotation axis of said workpiece carrying spindle is a tailstock 12 displaceable parallel to the axis of the spindle 11, along slides 13 disposed on the top face of the upper frame 9. The axial position of said tailstock 12 along said slides 13 is fixed by means of any currently known and used tightening means.

This upper frame 9 carries further a traverse slide 14 linearly displaceable parallel to the rotation axis of the workpiece carrying spindle 11 along slides 15 carried by the upper frame 9 and disposed parallel to the axis of the spindle 11 but laterally displaced with respect to the said axis.

In the example shown both the slides 13 of the tailstock 12 and 15 of the traverse slide 14 are made of one piece of fabrication with the upper frame 9.

The space 16 provided between the slides 13 and 15 and the headstock 10 constitutes a collecting vat for the refrigerating liquid used during the machining of a piece $p$ and is provided with a filter 17 giving access to a container placed in the lower part 8 of the frame in order to collect this refrigerating liquid to use it again.

Disposed on the front face 18 of the upper frame 9 different control members are located, used either for the manual control of the machine or for the pre-selection of a machining cycle which is automatically controlled by means of an electro-hydraulic control device.

The traverse slide 14 carries a forwarding slide 19 having a cylindrical body 20 sliding without clearance in a bore 21 provided in the slide 14. The axis of that bore 21 is perpendicular to the axis of the slides 15 of the traverse slide 14. This cylindrical body 20 is hollowed in order to partially house a driving-in-rotation device of a rotative cutting tool.

The part of said slide 19 merging out of the traverse slide 14 is constituted by a flange 22 presenting in its frontal face a circular fixing groove 23, having in transversal cross-section the general shape of a T.

One or several rods 24, the axis of which are parallel to the axis of the cylindrical body 20 and which are rigidly fixed on the rear face of the flange 22, extend inside a bore 25 provided in the slide 14 and a part of which 26 has a diameter corresponding to the one of the rods 24, enabling the fixation of the angular position of the forwarding slide 19 with respect to the traverse slide 14.

A push bar 27, disposed parallel to the axis of the forwarding slide 19, extends inside the slide 14 and is rigidly fixed on the top part of the flange 22 of the slide 19. This push bar carries an actuating member 28, the rear face of which co-operates with an endstroke abutment 29 fixed in an adjustable manner on the slide 14. This actuating member 28 limits also, by co-operating with its front face against a stop 30 fixed on the slide 14, the forward stroke of the slide 19.

Furthermore, this actuating member 28 is submitted to the action of an hydraulic forwarding device (not shown) provoking the step-by-step feeding of the slide 19. This hydraulic forwarding device will not be described here as numerous existing devices may be used.

A tool carrying head 31 is fixed against the frontal face of the slide 19 by means of fixing members engaged in the circular groove 23. This tool carrying head 31 is angularly displaceable with respect to the slide 19, and its angular position with respect to the said slide may be adjusted by means of a micrometric screw 32.

This tool carrying head 31 houses a part of the driving-in-rotation device of the tool and comprises a tool carrying spindle 33 having a vertical axis. This tool carrying head 31 comprises further a tailstock 34 which is axially displaceable within a support 35 fast with said head 31. A tool 36 is located between the tool carrying spindle 33 and the tailstock 34 and is angularly and axially fast with said tool carrying spindle 33.

The rotative cutting tool 36 is generally constituted by a worm cutter such as the ones generally used on the now existing gear hobbing machines.

Thanks to this mounting, it is thus possible not only to drive the tool 36 in rotation but also to dispose its rotation axis at a determined angle with respect to the rotation axis of the workpiece. Furthermore, thanks to the slide 19 and to the slide 14, it is possible to move the tool along directions respectively perpendicular and parallel to the axis of rotation of the workpiece carried by the spindle 11.

The gear hobbing machine described comprises an actuating mechanism for the different mobile members of said machine comprising among others a driving-in-rotation device of the tool carrying spindle 33, a driving-in-rotation device of the workpiece carrying spindle 11, a varying device of the speed of rotation of said workpiece carrying spindle as well as a traversing device which actuates the traverse slide 14 in its linear displacements.

This actuating mechanism of the different mobile members of the gear hobbing machine comprises a motor 37 rigidly fixed on the lower frame 8 and disposed inside of said lower frame, said motor being used for the driving of all the above mentioned devices.

The driving-in-rotation device of the tool carrying spindle 33 is carried by the traverse slide 14 and comprises a pulley 38 journaled on the slide 14 and driven in rotation by means of a belt 39 through the motor 37. This pulley 38 is connected, by the intermediary of an interchangeable gear train 40, 41 and by means of a shaft 42, to an inside fluted sleeve 43 disposed inside the body 20 of the slide 19. A fluted shaft 44, journaled in the body 20 of the slide 19, is engaged in the sleeve 43 and emerges inside the tool carrying head 31. This end of the shaft 44 carries a conical pinion 45 in mesh with another conical pinion 46 fast with an auxiliary shaft 47 journaled in the head 31.

This auxiliary shaft drives, by the intermediary of a gear train 48, 49, the tool carrying spindle 33.

The driving-in-rotation device of the workpiece carrying spindle 11, located inside the headstock 10, comprises a helical gear 50 rigidly fixed on the shaft 42 and meshing with an helical gear 51 fast with a fluted shaft 52 perpendicular to the shaft 42. A second helical gear 53 comprising an inside fluted hub is engaged on said fluted shaft and is able to move longitudinally along said shaft, still being angularly fast with it. This helical gear 53 meshes with an helical gear fast with a shaft 55, perpendicular to the fluted shaft 52, and driving, by the intermediary of an interchangeable gear train 56, 57, 58, 59, the input shaft 60 of a differential. This input shaft 60 is connected, by means of a gear train 61, 62 to a shaft 63 journaled in the frame 64 of said differential and by means of gears 65, 66, 67, to an output shaft of the said differential. This output shaft 68 comprises a worm 69 in mesh with a tangential wheel 70 fast with the workpiece carrying spindle 11.

The traversing device for the feeding of the milling cutter, actuating the traverse slide 14 in its straight displacement, is disposed in the upper frame 9 and comprises a pinion 71, fast with the input shaft 60 of the differential, driving through the intermediary of a gear train 72, 73, 74, 75, the shaft 76 of a direction reversing device. The output shaft 77 of this reversing device comprises a worm 78 in mesh with a tangential wheel 79 fast with an actuating shaft 80. This shaft 80 drives a lead screw 81 meshing with a nut 82 fast with the traverse slide 14. This slide 14 is thus moved in one or the other direction according to the direction of rotation of the lead screw 81.

The reversing device comprises further an input pinion 82 journaled on the input shaft 76 and connected to an output pinion 83, rigidly fixed on the output shaft 77, through the intermediary of a gear train 84, 85, 86. This reversing device, comprising also a coupling device 87, either manually or hydraulically controlled by means of a jack 88, able to render angularly solid the input shaft 76 either to the input pinion 82 or to the output pinion 83, enabling, for a given direction of rotation of the input shaft 76, the drive of the output shaft 77 either in the same direction or in the opposite direction. This coupling device 87 has also a middle rest position (position shown in FIG. 5) for which the output shaft 77 is not driven by the input shaft 76.

The varying device of the speed of rotation of the workpiece carrying spindle 11 comprises a pinion 89 fast with the actuating shaft 80 of the traverse slide 14 and connected by means of an interchangeable gear train 90, 91, 92, to a shaft 93 carrying a worm 94 meshing with a helical wheel 95 which is fast with the frame 64 of the differential.

The working of the described gear hobbing machine is the following:

The operator chooses the gear trains 40, 41, and 56–59 as a function of the desired speed of rotation of the tool carrying spindle and of the workpiece carrying spindle. These speeds are determined on the one hand by the number of teeth of the workpiece and on the other hand by the tool used for the machining of this workpiece.

The operator chooses then, by means of the gear train 72–75, the forward traverse speed of the tool, that is to say the speed of the straight displacement of the traverse slide 14. This forward traverse speed, determined by the gears 72–75, is the one corresponding to one revolution of the workpiece and depends on the material of said workpiece.

Then the operator chooses by means of the gear train 89–92 the speed of rotation of the frame 64 of the differential so as to obtain the helix of the desired pitch of the workpiece. For a spur gear the wheels 90–92 are disconnected and the shaft 93 is locked.

The operator then adjusts the angular position of the head carrying tool 31 by means of the micrometric screw 32 so that the axis of rotation of the tool forms an angle with respect to the axis of rotation of the workpiece which is equal to the desired inclination for the toothing.

The machine is then ready to cut the helical toothing at the periphery of the workpiece.

From that moment the following operations are done, either directly manually by the operator or by an automatic control device of the machine which is set in function by the operator:

(1) The starting of the motor 37 causes the actuation of the mobile members of the machine driven by said motor.

By means of the mechanical linkages described this motor drives in rotation the cutting tool at the desired speed and, the coupling device 87 being in its middle rest position, the workpiece carrying spindle 11 is driven at its speed $vo$ and the traverse slide 14 is not yet driven by said motor.

(2) By means of the hydraulic forwarding device (not shown) the forwarding slide is moved toward the workpiece until the tool is located at a distance from the workpiece corresponding to its machined size after the first pass, the tool being however axially displaced with respect to the workpiece.

(3) The coupling device 87 is engaged in the position for which the rotation of the frame 64 of the differential causes an increase of the speed of rotation $vo$ of the workpiece which is thus driven by the motor 37 at the speed $$vo + \frac{dv}{2}$$

This motor drives then the traverse slide 14 in its linear displacement in direction of the workpiece. During this traverse displacement, the first machining pass is effected for example in conventional cutting.

(4) By means of the feeding device the forwarding slide is displaced, at the end of the traverse stroke, towards the workpiece of a determined amount corresponding to the deepness of the second machining pass.

(5) At the end of the traverse stroke as well, that is to say when the first machining pass has been done, the position of the coupling device 87 is changed provoking on the one hand the reversing of the direction of the straight displacement of the traverse slide 14 and on the other hand the reversing of the direction of rotation of the frame 64 of the differential, provoking thus a modification of the speed of rotation of the workpiece of an amount equal to $dv$. The frame 64 of the differential revolving now in a direction provoking the reduction of the speed $vo$, the workpiece revolves at the speed $$vo - \frac{dv}{2}$$

The second machining pass is done during the return traverse stroke and the machining is done in climb cutting, the tool and the workpiece revolving constantly in the same direction.

(6) At the end of the return traverse stroke one causes a new feeding of the forwarding slide, then the reversing of the straight movement of the traverse slide 14 as well as the reversing of the direction of rotation of the frame 64 of the differential in the above described manner. The machine then makes a new machining pass in conventional cutting.

(7) The cycle continues thus until the moment when, at the end of a return traverse stroke, the workpiece has been machined to its final size. The coupling device 87 is then disconnected and replaced in rest position which causes the stopping of the displacement of the slide 14 and of the rotation of the frame 64 of the differential.

(8) The motor 37 is stopped, causing the stopping of the rotation of the tool and of the workpiece.

(9) The feeding slide is then displaced in the reverse direction causing the separation of the tool from the workpiece and the return of said tool into its initial or rest position.

It is evident that these different operations may be controlled either manually by the operator or automatically by means of an electro-hydraulic control device, the design of which is within the scope of the knowledge of any man skilled in the art and which therefore will not be described here.

In a non-illustrated variant the gear hobbing machine comprises a locking device of the frame 64 of the differential so that the workpiece revolves at its speed $v_o$ in order to cut a spur toothing. In this case, at the end of the traverse stroke of the tool, one provokes the feeding of the tool of a determined amount and the reversing of the forwarding movement.

In another variant the differential as well as the varying device of the speed of rotation of the workpiece carrying spindle could be omitted. In this case the machine would be intended for the hobbing of spur gears only.

One embodiment of the gear hobbing machine has been described by way of example, but it is evident that numerous equivalent mechanical realizations could be designed, enabling the same cycle of movements for the milling cutter, without departing from the scope of the present invention.

In particular, in a variant it would be possible to modify the value of the traverse speed of the cutting tool at the end of its traverse stroke. In that way, it would be possible, for example, to have a traverse speed of the tool corresponding, during the forward traverse stroke, to the prefinishing of a workpiece whereas the traverse speed of the tool during its return traverse stroke would correspond to a finishing pass.

Furthermore, when a workpiece may be machined in only one pass, for example, when it is the matter of finishing a rough piece, it is possible to machine a first piece during the forward traverse stroke then at the end of the traverse stroke to change the workpiece and to machine a second workpiece during the return traverse stroke.

I claim:

1. A helical gear hobbing machine comprising a frame, a traverse slide mounted for reciprocation on said frame, a driving motor mounted on said frame, a hob mounted for rotation on said traverse slide and drivingly connected to said motor, said motor driving said hob at a speed of rotation that varies as the speed of rotation of the said motor, a first interchangeable gear train, interchangeable feed gears and a reversing device drivingly connecting said motor to said traverse slide, said interchangeable feed gears determining the speed of the forward and return working strokes of said traverse slide, a workpiece-carrying spindle rotatably mounted on said frame and drivingly connected to said driving motor through said first interchangeable gear train thereby to determine the mean speed of rotation of said workpiece-carrying spindle, and a differential device having a frame which is drivingly connected to said driving motor by means of said first interchangeable gear train, said interchangeable feed gears and said reversing device and a second interchangeable gear train determining the speed of rotation of said frame of said differential device, whereby actuation of said reversing device causes simultaneously the reversing of the direction of the displacement of the traverse slide and a modification of the speed of rotation of said workpiece-carrying spindle so that the hob cuts on a workpiece mounted on said spindle a tooth surface the slope of which is independent of the traverse direction of said traverse slide.

2. A helical gear hobbing machine comprising a frame, a driving motor mounted on said frame, a workpiece-carrying spindle rotatably mounted on said frame, a traverse slide mounted for reciprocation on said frame, a tool-carrying head mounted on said traverse slide for movement in a direction perpendicular to the direction of reciprocation of said traverse slide, a hob rotatably mounted on said tool-carrying head and drivingly connected to said driving motor, first transmission means including a differential device and a first interchangeable gear train drivingly connecting said driving motor to said workpiece-carrying spindle, second transmission means including said first interchangeable gear train and interchangeable feed gears and a reversing device drivingly connecting said driving motor to said traverse slide, and third transmission means including said first interchangeable gear train and said interchangeable feed gear and said reversing device and second interchangeable gear train drivingly connecting said driving motor to a frame of said differential device.

3. A helical gear hobbing machine comprising a frame, a driving motor mounted on said frame, a workpiece-carrying spindle rotatably mounted on said frame, a traverse slide mounted for reciprocation on said frame, a tool-carrying head mounted on said traverse slide for movement in a direction perpendicular to the direction of reciprocation of said traverse slide, a hob rotatably mounted on said tool-carrying head and drivingly connected to said driving motor, said driving motor being drivingly connected to said traverse slide through a first interchangeable gear train and interchangeable feed gears and a reversing device, said workpiece-carrying spindle being drivingly connected to the output of said first interchangeable gear train through a differential device having a frame which is drivingly connected to the output of said reversing device through a second interchangeable gear train.

4. A helical gear hobbing machine comprising a frame, a driving motor mounted on said frame, a workpiece-carrying spindle rotatably mounted on said frame, a traverse slide mounted for reciprocation on said frame, a tool-carrying head mounted on said traverse slide for movement in a direction perpendicular to the direction of reciprocation of said traverse slide, a hob rotatably mounted in said tool-carrying head and drivingly connected to said driving motor, said driving motor being drivingly connected to both said traverse slide and said workpiece-carrying spindle, feed gears and a reversing device in the driving connection connecting said driving motor to said traverse slide, and a differential device having a frame which is drivingly connected to said reversing device, said differential device connecting said driving motor to said workpiece-carrying spindle.

References Cited by the Examiner

UNITED STATES PATENTS

| | | | |
|---|---|---|---|
| 2,208,804 | 7/40 | Pfauter | 90—22 X |
| 2,563,982 | 8/51 | Warner | 90—4 |
| 2,587,449 | 2/52 | Ericson | 90—21.5 X |
| 2,837,010 | 6/58 | Davenport | 90—4 |
| 2,856,834 | 10/58 | Berthiez | 90—4 |
| 3,030,866 | 4/62 | Enghofer | 90—4 |
| 3,055,271 | 9/62 | NaKada | 90—4 |
| 3,077,146 | 2/63 | Ufert | 90—4 |
| 3,107,579 | 10/63 | Budnick et al. | 90—4 |

WILLIAM W. DYER, JR., *Primary Examiner.*